United States Patent [19]

Masel et al.

[11] Patent Number: 4,793,151

[45] Date of Patent: Dec. 27, 1988

[54] ICE-CREAM MAKING MACHINE

[75] Inventors: Ruben Masel, 16 Hatzabar Street, Kiron; George Valdshtein, Holon; Philipp Leitner, Rehovot; Gustavo Kronenberg, Even Yehuda, all of Israel

[73] Assignee: Ruben Masel, Kiron, Israel

[21] Appl. No.: 33,434

[22] Filed: Apr. 1, 1987

[51] Int. Cl.$^4$ .................................................. A23G 9/12
[52] U.S. Cl. .............................. 62/306; 62/342; 366/312
[58] Field of Search ................ 62/306, 307, 342, 343; 366/312, 313; 165/94

[56] References Cited

U.S. PATENT DOCUMENTS

| | | | |
|---|---|---|---|
| 1,156,050 | 10/1915 | Brierley | 366/313 |
| 2,082,752 | 6/1937 | Lewis et al. | 62/343 X |
| 2,282,289 | 5/1942 | Vogel | 366/312 |
| 2,282,662 | 5/1942 | Lindsey | 62/342 |
| 2,282,862 | 5/1942 | Genova | 62/342 |
| 2,304,579 | 12/1942 | Lindsey | 62/342 |
| 2,622,411 | 12/1952 | Ogden | 366/312 X |
| 2,646,974 | 7/1953 | Read | 62/343 X |
| 2,671,646 | 3/1954 | Lindsey | 259/24 |
| 3,304,737 | 2/1967 | Strutynski | 62/342 X |
| 3,960,368 | 6/1976 | Kishimoto | 259/10 |
| 4,326,389 | 4/1982 | Frost | 62/342 |
| 4,357,112 | 11/1982 | Davis | 366/279 |
| 4,518,262 | 5/1985 | Bornemann et al. | 366/156 |
| 4,632,566 | 12/1986 | Masel et al. | 366/149 |

FOREIGN PATENT DOCUMENTS

14279 11/1880 Fed. Rep. of Germany .
2538858 3/1977 Fed. Rep. of Germany .

*Primary Examiner*—William E. Tapolcai
*Attorney, Agent, or Firm*—Helfgott & Karas

[57] ABSTRACT

A machine for making ice cream or other frozen comestible from a liquid. The machine includes an outer housing in which is inserted a removable freezing chamber which can be independently frozen and replaced in the chamber. Internally of the freezing chamber is a compartment in which can be placed a rotary assembly including a plurality of radially extending blades rotatable with the compartment. The blades include slits at their outer edges defining fingers for atomizing, aerating and moving the frozen liquid through the freezing chamber to its outlet. The blades are of a hard, elastic, low friction material with the outer tips of their fingers lying on an outer diameter larger than the inner diameter of the freezing compartment. The blades are then stressed when inserted into the freezing chamber to forceably engage the inner cylindrical surface of the freezing chamber and are twisted like a helix towards the outlet of the freezing chamber. A presetable control is provided in the top cover of a storage compartment in which the liquid freezing the machine is stored. The control is used to adjust the feed rate of the liquid into the freezing chamber independently of the viscosity of the liquid. An air pump can be included for injecting air under superatmospheric pressure into the freezing chamber as well as a liquid pump for injecting the liquid under superatmospheric pressure into the freezing chamber.

12 Claims, 4 Drawing Sheets

ICE-CREAM MAKING MACHINE

The present invention relates to ice-cream making machines, particularly to a machine for making ice-cream or other frozen comestibles at home. The invention is especially, but not exclusively, directed to the type of ice-cream making machine described in our prior U.S. Pat. No. 4,632,566, as will be described more particularly below.

Our prior U.S. Pat. No. 4,632,566 describes a machine for making ice-cream or other frozen comestible, comprising a freezing chamber, feeding means for feeding liquid into the freezing chamber, cooling means for cooling the freezing chamber below the freezing point of the liquid, and a rotary assembly including a plurality of radially-extending blades rotatably mounted within the freezing chamber and formed with serrations defining fingers at their outer edges for atomizing, aerating, and moving the frozen liquid through the chamber to its outlet end.

An object to the present invention is to provide a number of improvements to the type of ice-cream making machine described in U.S. Pat. No. 4,632,566.

According to one important improvement, the plurality of blades are made of a hard, elastic, low-friction, plastic material; in addition, in the unstressed condition of the blades, the outer tips of their fingers lie on an outer diameter larger than the inner diameter of the freezing chamber, such that when the rotary assembly is inserted into the freezing chamber, the fingers of the blades are deformed by their engagement with the inner cylindrical surface of the freezing chamber to a stressed condition wherein they forcibly engage the inner cylindrical surface of the freezing chamber and are twisted like a helix towards the outlet end of the freezing chamber.

Particularly good results have been obtained when each blade, including its fingers, is substantially planar in the unstressed condition of the blade, and when the blades and their fingers are made of polytetrafluoroethylene.

It has been found that machines constructed in accordance with the above-described novel blade structure produces a frozen product having a very creamy texture closely resembling ice-cream from almost any kind of flavoured liquid, such as fruit juices, sugared water, and flavoured water, even through no milk, cream, fat, or emulsifying additive is included. This highly desirable creamy texture is believed to result, to a substantial extent, from the friction produced by the forcible engagement of the pre-stressed blades with the inner surface of the freezing chamber. Thus, the blades not only scrape the frozen film off the freezing chamber surface, but also, by the friction produced, remelt the film before it is again thrown against the freezing surface by the lower fingers and is again instantly refrozen. The liquid is thus successively frozen, melted, and refrozen many times during its travel from the inlet end to the outlet end of the freezing chamber.

It has also been found that the feeding rate of the liquid is quite critical. While it was found that a high feeding rate for a given cooling surface tends to produce a softer frozen product, it was also found, quite unexpectedly, that a slow feeding rate also produced a softer (unduly soft or slushy) product. The latter result is believed to be due to the fact that the liquid also acts as a lubricant to the blades moving against the freezing chamber wall, and to the interplay of the cooling (by the cooling medium) and heating (by the friction forces of the blades moving against the freezing chamber wall) produced during the travel of the product through the freezing chamber. It was found that the liquid should be fed at a rate of 5–20 cc/min per 100 $cm^2$ of cooling surface, and that optimum results were produced when this feeding rate was 12–14 cc/min of feed liquid per 100 $cm^2$ of cooling surface.

According to another feature of the present invention, the feeding means comprises a supply container disposed vertically above the freezing chamber and closed by a top cover, a feed line from the bottom of the container to the upper end of the freezing chamber for gravity feeding the liquid thereto, an on/off valve in the feed line, and a presettable control valve in the top cover venting the upper end of the container to the atmosphere effective to fix the feed rate of the liquid to the freezing chamber substantially independently of the viscosity of the liquid.

According to still further features of the present invention, the machine further includes an air pump for injecting air under superatmospheric pressure into the freezing chamber, and also a liquid pump for the liquid under superatmospheric pressure-injecting into the freezing chamber. The latter features enhance the atomization of the liquid and thereby the creamy texture of the frozen product. In addition, pressure-injecting the liquid permits the liquid also to include solid particles, such as nuts, chocolate chips food pieces and the like, which enriches the quality of the frozen product; and pressure-injecting the air into the freezing chamber, not only enhances the atomization of the liquid, but also permits larger quantities of air to be introduced to produce almost any desired degree of softness in the frozen product.

Further features and advantages of the invention will be apparent from the description below.

The invention is herein described, by way of example only, with reference to the accompanying drawings, wherein.

Figure 1:
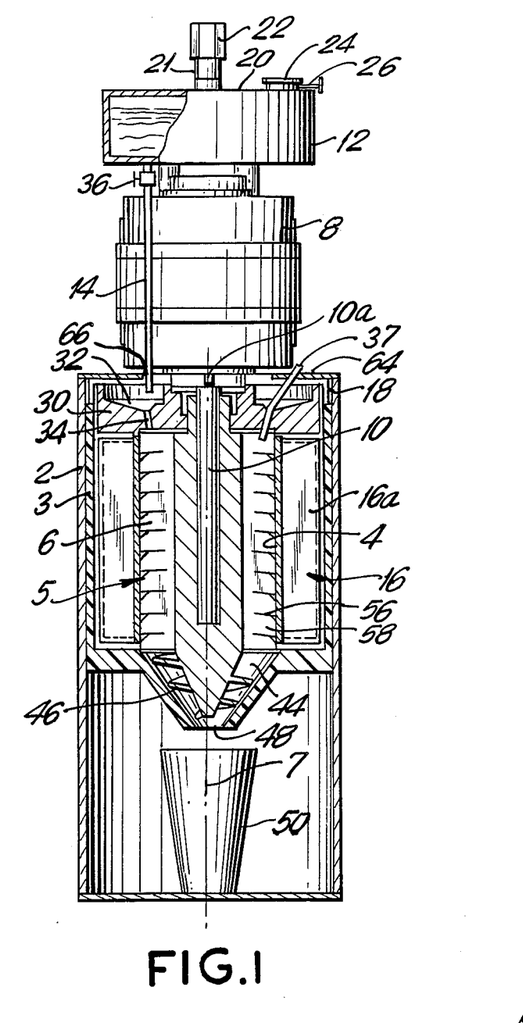
FIG. 1 is a side elevational view, partly in section, illustrating one form of ice-cream making machine constructed in accordance with the present invention.
Figure 2:
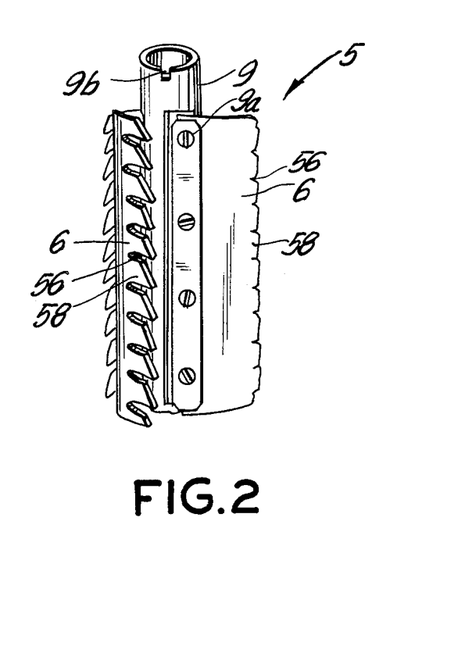
FIG. 2 is a side elevational view illustrating the construction of the rotary assembly in the machine of FIG. 1.
Figure 3:
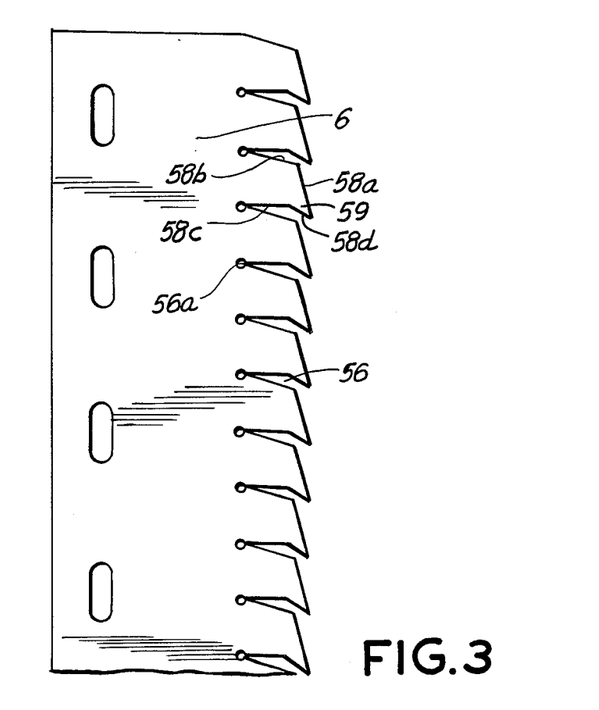
FIG. 3 is a side elevational view more clearly illustrating the structure of one of the blades in the rotary assembly of FIG. 2.

The machine illustrated in FIGS. 1–4 of the drawings is designed particularly for use in the home for making ice-cream or other frozen comestible as and when desired by the consumer. The illustrated machine comprises an outer housing 2 and an inner housing 3 enclosing a vertically-extending freezing chamber 4 containing a rotary assembly 5 having a plurality of radially-extending blades 6 rotatable about the vertical axis 7 of chamber 4. The blades 6 are rotated by an electrical motor 8 mounted at the upper end of housing 2. The blades 6 are secured to a sleeve 9 by a plurality of fasteners 9a (FIG. 2). Sleeve 9 is in turn coupled to the motor shaft 10 by a notch 9b formed in sleeve 9 receiving a pin 10a in the motor shaft 10.

A supply container 12 supported at the upper end of motor 8 is adapted to receive a supply of the liquid used for making the ice-cream or other frozen comestible. This liquid is fed by gravity via a feeding tube 14 from the bottom of supply container 12 to the inlet end of freezing chamber 4. A freezing cartridge 16 is used for cooling the freezing chamber 4 to a temperature below the freezing point of the liquid fed to the chamber from supply container 12.

Figure 1A:
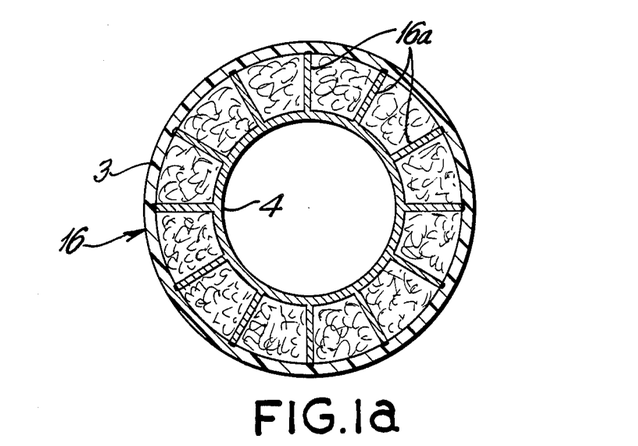
FIG. 1a is a transverse sectional view of the removable freezing cartridge included in the machine of FIG. 1.

Freezing cartridge 16 is of the removable rechargeable type. It is constructed as a single integral unit, including an inner metal cylinder serving as the freezing chamber 4, and a phase-changing material having a melting point lower than the freezing point of the liquid to be frozen. Such phase-changing materials are known, one example being ethylene glycol. The cartridge further includes metal fins 16a (FIG. 1a) extending radially from the inner metal tube 4 to its housing 3 in order to increase the heat transfer from and to the phase-changing material.

Normally, the freezing cartridge 16 is kept in the freezer compartment, usually from $-12°$ C. to $-20°$ C., of a refrigerator so that its phase-changing material is in the frozen state. It is removed from the refrigerator and placed within its housing 3 when the machine is to be used for making ice-cream or other frozen product. Its housing 3 is provided with a quickly-detachable coupling, shown schematically at 18 in FIG. 1, such as a bayonet pin and socket coupling, for quickly attaching it to, and detaching it from, the inner face of housing 2.

Supply container 12 includes a top wall 20 closing the upper end of the container from the atmosphere. Top wall 20 is formed with a filling opening 21 closed by a cap 22, which cap is removed when the container is to be filled with the liquid to be used for making the ice-cream or other frozen comestible. Top wall 20 of the container is formed with a further opening 24 for venting the interior of the container to the atmosphere. The cross-sectional area of venting opening 24 is adjustable by a threaded pin 26 to control the rate of air inletted into container 12.

Feeding tube 14 extends from the bottom of the supply container 12 into the housing 2 to overlie a distributor plate 30. Distributor plate 30 is formed with an annular channel 32 for receiving the liquid which is gravity-fed thereto via feeding tube 14, and with an opening 34 leading from channel 32 to the upper, inlet end of the freezing chamber 4. Feeding tube 14 is provided with an on/off valve 36 which merely starts or stops the flow. The actual rate of flow of the liquid via feed tube 14 is controlled by valve 26 which controls the venting of the interior of supply container 12 to the atmosphere, and thereby controls the rate of feed of the liquid via distributor plate 30 to the inlet end of the freezing chamber 4.

As indicated earlier, the rate of feed of the liquid to the freezing chamber is quite critical, since it was found that a rate of feed which was either too high or too low would produce an unduly soft or "slushy" product. This feed rate should be fixed at the factory to a rate of 5-20, preferably 12-14, cc/min per 100 $cm^2$ of cooling surface. Using valve 26 to control the feed rate, by controlling the venting of the interior of the supply container 12 to the atmosphere, makes the feed rate substantially independent of the viscosity of the liquid used.

Freezing chamber 4 is also supplied with a quantity of air via an air feeding tube 37 passing through another opening in the distribution plate 30. The rate of feed of the air into freezing chamber 4 may be controlled by a valve (not shown) which may be preset according to the desired density of the ice-cream or other frozen comestible. Thus, a higher rate of feed of air into freezing chamber 4, as compared to the rate of feed of the liquid ingredients, will produce a softer frozen product as compared to that produced with a lower rate of feed of air.

The plurality of radially-extending blades 6 carried by rotary assembly 5 are rotatably mounted within the freezing chamber 4 of the freezing cartridge 16. They are so constructed, as will be described more particularly below, that when the blades 6 are rotated by electric motor 8, they atomize, aerate, and move the liquid frozen within chamber 6 to an outlet chamber 44, where the frozen liquid is then ejected by a screw 46 carried by rotary sleeve 9, through a conical discharge opening 48, formed in housing 3 of the freezing cartridge 16, into a container 50.

An important feature in the ice-cream making machine illustrated in the drawings is the construction of the blades 6 in the rotary assembly 5 for atomizing, aerating and moving the frozen liquid through the freezing chamber 4. As shown particularly in FIG. 4, there are three radially-extending blades 6 equally spaced within freezing chamber 4 and secured along their inner edges to the inner sleeve 9. Each of the blades 6 is formed with a plurality of slits 56 (FIG. 3) starting from its outer edge to a slight distance inwardly of the blade so as to define a plurality of fingers 58 at the outer edge of each blade. Each of the fingers 58 is formed with an outer oblique edge 58a. Each of the slits 56 starts at a small circular opening 56a and is shaped such that the fingers 58 produced by them each include an upper oblique edge 58b and a lower edge which has an inner portion 58c substantially perpendicular to the longitudinal axis of the blade, and a shorter outer portion 58d at a smaller angle to the blade longitudinal axis than the upper edge 58b, to define a tail 59 below edge 58c of the finger.

Figure 4:
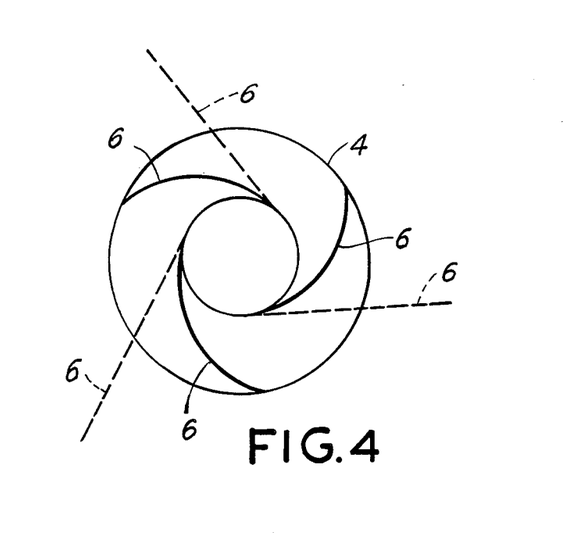
FIG. 4 is a top plan view illustrating the plurality of rotary blades in the freezing chamber, the blades being illustrated in full lines in their stressed condition in the freezing chamber, and in broken lines in their unstressed condition before introduction into the freezing chamber.

Each blade 6, together with the fingers 58 formed at its outer edges, is substantially planar in the unstressed condition of the blade, as illustrated in broken lines in FIG. 4. In this unstressed condition, the blades 6 attached to the inner sleeve 9 extend in the radial direction with respect to freezing chamber 4 in which they are disposed, and the outer tips of their fingers 58 lie on a diameter larger than that of the freezing chamber. However, when the assembly of blades 6 is inserted into the cylindrical freezing chamber 4 as shown in full lines in FIG. 4, the blades are deformed by the inner cylindrical surface of the freezing chamber to a stressed condition wherein they forcibly engage the inner cylindrical surface of the freezing chamber, and their fingers 58, particularly their tails 59, are twisted like a helix towards the outlet (lower) end of the freezing chamber.

Housing 2 is closed by a top wall 64 to which is secured the air feed tube 37. Wall 64 is also formed with an opening 66 for receiving the liquid feed tube 14.

The illustrated machine may be used for making ice-cream or other frozen comestible in the following manner:

The freezing cartridge 16 is normally stored within the freezer compartment of the home refrigerator so that its phase-changing material is always in frozen condition whenever the cartridge is to be used for making a batch of the frozen product. The cartridge 16, including the inner metal cylinder 4 serving as the freezing chamber, is inserted into the inner housing 3; the blade assembly 5 is inserted into the metal cylinder; and the distributor plate 30 and cover 64 are placed over the cartridge and blade assembly. The cartridge-blade assembly is then applied to the machine by inserting the notch in sleeve 9 into pin 10a in the motor shaft 10, and attaching housing 3 to housing 2 by the quickly-detachable coupling 18. The freezer cartridge 16 and distributor plate 30 are restrained against rotation by any suitable means, e.g., a rib (not shown) on the cartridge and distributor plate received within a groove in housing 3, so that only the rotary assembly 5 within freezer compartment 4 is free to rotate.

Container 12 is filled with the liquid to be used for making the frozen product. Electric motor 8 is energized to rotate the rotary assembly 5 including blades 6, and on/off valve is turned on so as to start the flow of liquid from container 12 via feed tube 14 and distributor plate 30 to the inlet (upper) end of the freezing chamber 4. As described earlier, the rate of feed of the liquid is pre-fixed (e.g., at the factory) to 5-20, preferably 12-14, cc/min per 100 cm$^2$ of cooling surface. As also described above, since valve 24 controls the feed rate by the rate at which the container 12 is vented to the atmosphere, this feed rate is substantially independent of the viscosity of the liquid used as any particular time.

Energization of motor 8 rotates the rotary assembly 5 including blades 6 and screw 46 with respect to the freezing chamber 4 and the distributor plate 30 of the freezing cartridge 16. As described earlier, the rotary blades 6, when received within the freezing chamber 4, are in a pre-stressed condition wherein they forcibly engage the inner cylindrical surface of the freezing cartridge, and their outer fingers 58 are twisted, like a helix, towards the screw 46. Thus, as the liquid feeds by gravity via feed tube 14, channel 32 and opening 34 of distributor plate 30 into the freezing chamber 4, the liquid is forced against the inner face of the freezing chamber 4 to form a thin film on the wall of the freezing chamber where it is instantly frozen by the low temperature produced by the phase-changing material. The frozen material is immediately scraped off the wall by the pre-stressed fingers 58 at the ends of the rotating blades 6, and is gradually moved downwardly along the inner surface of freezing chamber 4 to its bottom 44 from where it is fed by screw 46 out of opening 48.

The result is a product having a creamy texture very closely resembling that of ice-cream even though no milk, cream or emulsifying additive is used. As described earlier, this highly desirable creamy texture is believed to result from the successive freezings (by the cooling medium) and meltings (by the friction of the blades 6 against the inner surface of the freezing chamber 4), together with the repeated atomization and aeration, to which the material is subjected as it moves downwardly through the freezing chamber. Thus, during each level of movement of the material through the freezing chamber 4, the forcible engagement of the pre-stressed blades with the inner surface of the freezing chamber not only cleanly scrapes the frozen film off the latter surface, but also remelts the film by the friction produced, re-atomizes the material and re-aerates it, before the material is again thrown against the freezing surface by the next lower level fingers where it again instantly refreezes.

As also described above, the feeding rate of the liquid was found to be quite critical because the liquid acts not only as the medium to be frozen, but also acts as a lubricant which affects the frictional forces between the blades and the inner surface of the freezing chamber 4. Thus, if the feeding rate is too high, there is insufficient cooling of the liquid as it travels through the freezing chamber so that it outputs an unduly soft product; and if the feeding rate is too low, an unduly soft product was also found (unexpectedly) to result because the lubricating effect of the liquid, with respect to the contact between the pre-stressed blades 6 and the inner surface of the freezing chamber 4, is reduced so that the frictional forces, and the heat generated, is high. As indicated earlier, this feeding rate should be from 5-20, preferably 12-14, cc/min per 100 cm$^2$ of cooling surface.

As one example, one pint of liquid within supply container 12 may be used for producing a batch of 6-8 servings of a frozen comestible in a processing time of about 12-14 minutes.

Figure 5:
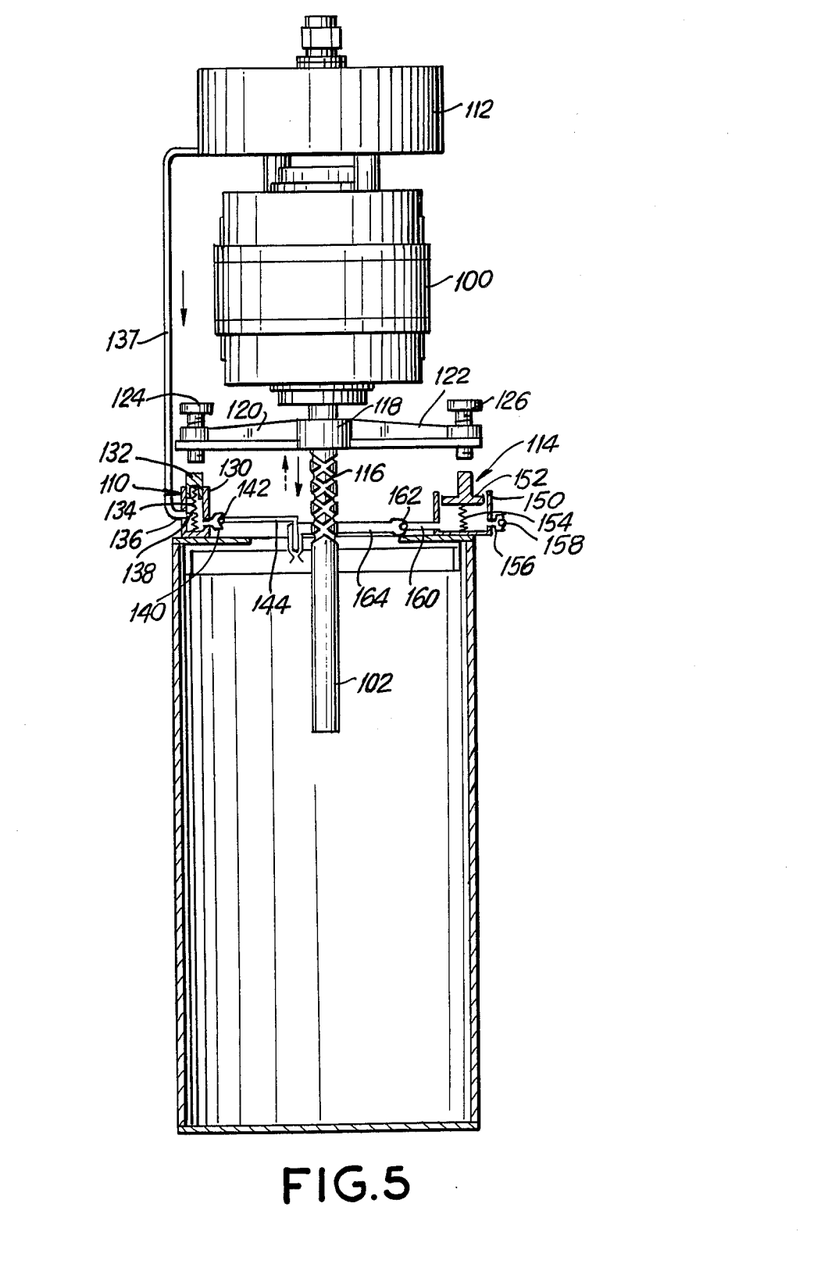
FIGS. 5 and 6 illustrate two further embodiments of the invention, including air and liquid pumps for injecting air and liquid under superatmospheric pressure into the freezing chamber.
Figures 6, 7:
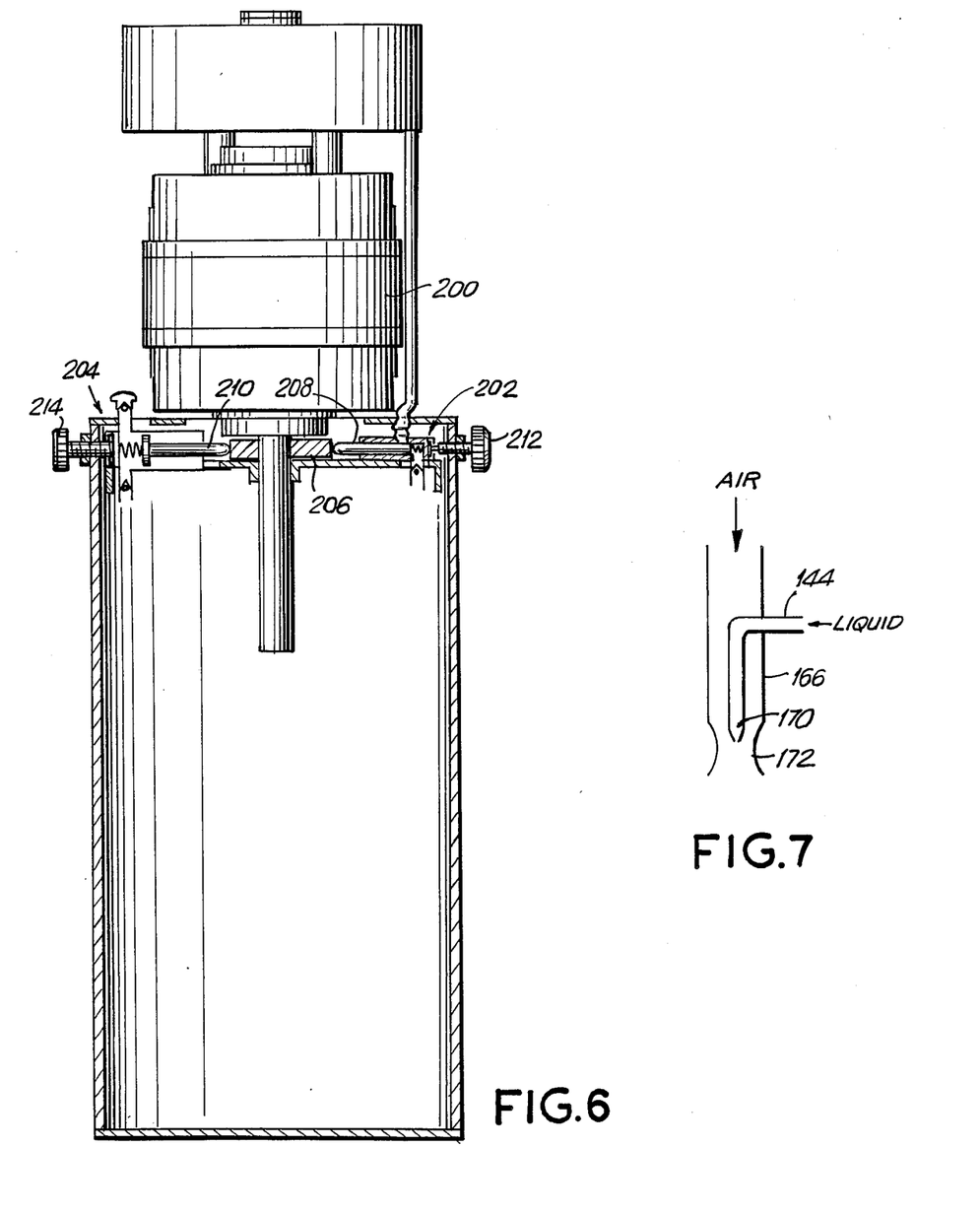
FIG. 7 illustrates the construction of an air-liquid injector which may be used in the machine of FIGS. 5 or 6.

FIGS. 5 and 6 illustrate two embodiments of the invention which may be used for producing an even larger variety of frozen products, including products containing solid particles, such as nuts, chocolate chips, fruit pieces, and the like. The machines illustrated in FIGS. 5 and 6 also use the blade structure and rechargeable freezing cartridge described above (not shown in these figures), but further include an air pump for injecting air, and a liquid pump for injecting the liquid ingredients, into the freezing chamber.

More particularly, the machine illustrated in FIG. 5 comprises a motor 100 having a motor shaft 102 coupled to the rotary assembly (not shown) rotatable within the freezing cartridge (not shown). The rotary assembly may be the of the same structure as assembly 5 described above; and the freezing cartridge may also be the same as cartridge 16 described above.

The machine illustrated in FIG. 5 includes a pump, generally designated 110, for pumping liquid from a container 112 into the freezing chamber of the freezing cartridge 106. The machine also includes an air pump 114 for injecting air into the freezing chamber during the operation of motor 100. For this purpose, motor shaft 102 is formed with threads 116 of a known configuration so as to cause a nut 118 to reciprocate, upwardly and downwardly, during the rotation of the motor shaft. Nut 118 includes a pair of arms 120, 122, each carrying a threaded pin 124, 126, for driving the liquid pump 110 and the air pump 114, respectively.

The liquid pump 110 includes a cylinder 130 and a piston 132 movable within the cylinder and urged to its outer position by a spring 134. Cylinder 130 includes an inlet 136 connected via feed tube 137 to the liquid supply container 112, which inlet is closed by one-way valve 138 permitting liquid flow only into the cylinder. Cylinder 130 also includes an outlet 140 closed by one-way valve 142 permitting liquid flow only out from the cylinder, the liquid flowing to a feed tube 144 leading to the inlet (upper) and of the freezing chamber within the freezing cartridge 106.

The air pump 114 includes a cylinder 150 and a piston 152 urged to its outer position by a spring 154. Cylinder 150 is formed with an inlet 156 closed by one-way valve 158 permitting air flow only into the cylinder, and with an outlet 160 closed by a one-way valve 162 permitting air flow only out from the cylinder. The air outletted from the cylinder is fed via a feed tube 164 to a nozzle 166 located at the outlet end of the liquid feed tube 144.

FIG. 7 better illustrates the structure of the nozzle 166 at which the air and liquid are discharged into the freezing chamber. Thus, the liquid feed tube 144 terminates in a nozzle 170 at the inlet end of the freezing chamber. This liquid nozzle 170 is enclosed by the air nozzle 166. The latter nozzle includes a restriction 172 aligned with the outlet tip 170 of the liquid nozzle, which restriction increases the velocity of the air at this point, by reducing the pressure. This arrangement highly aerates the liquid as it is injected into the freezing chamber.

It will thus be seen that during the operation of the motor 100, its nut 118 is cyclically reciprocated through downward and upward strokes. During the forward strokes, its pin 124 engages piston 132 to inject a quantity of liquid from cylinder 130 into the freezing chamber of the freezing cartridge 106 via feed tube 144. Also its pin 126 engages piston 152 to inject a quantity of air from cylinder 150 via feed tube 164 and nozzle 166 so as to aerate the liquid as it is injected into the freezing chamber. During the return strokes of nut 118, cylinder 130 is expanded so to as draw into it another quantity of liquid, and cylinder 150 is also expanded so as to draw into it another quantity of air.

The so injected and aerated liquid is instantly frozen against the wall of the freezing chamber and is scraped, melted, and refrozen as it moves gradually downwardly along the wall b the blade fingers, as described above with respect to FIGS. 1-4, so that the frozen product outputted from the machine is of a highly creamy texture even though no milk, cream, or fat, nor emulsifying additive is included in the original liquid ingredients.

Since the liquid is pressure-injected into the freezing chamber in the embodiment of FIG. 5, the liquid could be of a highly viscous nature, and could also include solid particles, such as nuts, chocolate chips, fruit pieces and the like; this increases the large variety of frozen products capable of being produced by the illustrated machine. In addition, the introduction of air into the freezing chamber by pressure-injection not only enhances the atomization and aeration of the liquid ingredients, but also enables the machine to be used for producing frozen products having a large variation in softness, according to the relative quantity of air introduced into the freezing chamber. Both the quantity of liquid, and the quantity of air, injected into the freezing chamber with each reciprocation of the drive nut 118 can be preset by suitable adjustment of threaded pins 124 and 126, respectively.

FIG. 6 illustrates another arrangement that may be used for injecting the liquid and air into the freezing chamber. The arrangement illustrated in FIG. 6 also includes an electric motor 200 which drives the rotary assembly (not shown, but the same as described above with respect to FIGS. 1-4), which motor also drives a liquid pump for injecting liquid into the freezing chamber, and an air pump 204 for injecting air into the freezing chamber. I this case, however, the drive is in the form of an eccentric bearing 206 coupled to the motor drive shaft and effective to reciprocate plungers 208 and 210, respectively, of the liquid pump 202 and air pump 204. The liquid pump 202 further includes a threaded member 212 adjustable to preset the quantity of liquid discharged from the pump during each cycle of operation, and similarly the air pump 204 includes a threaded member 214 adjustable to preset the quantity of air discharged with each reciprocation of its plunger.

The structure and operation of the liquid pump 202 and air pump 204 in the machine of FIG. 6 are otherwise basically the same as described above with respect to the machine of FIG. 5. The machine of FIG. 5 has the advantage that it can produce larger displacements with each cycle of operation, and therefore can be operated at a lower speed; whereas the machine of FIG. 6 has the advantage of a simpler and more compact arrangement enabling it to operate at higher speeds even through the displacement for each cycle is less.

Referring again to FIG. 1, it will be noted that the container 2 and the freezing chamber therein 4 are covered by the outer cover 64. Accordingly, the only entry for the air is through the air feeding tube 37 which is connected through a narrow constricted air inlet in the cover 64 and passes through the feeding tube 37 to direct the air to the interior of the mixing chamber. The air itself enters through an inlet which is separate from the inlet 14 through which the liquid ingredient is supplied.

As the blades rotate, they create a negative pressure within the chamber which causes the air to be sucked in through the inlet and the passage 37. Because of the presence of the small opening in which the air can come in, and because of the reduction of air pressure within the chamber, the air that is sucked in is actually injected into the mixing chamber under a pressure. As a result of the injection of air under pressure, the quality of the ice cream product is improved. The injection of air results in a greater air content within the ice cream ingredient. This creates a creamer, lighter, and improved quality product at a less cost than normal.

The air injected is actually self regulating within the machine. Specifically, as the speed of the rotor is increased, the blades will cause an increase in the speed of operation. Thus, more liquid will be accommodated through the greater speed since it will be atomized at a faster rate, and thrown and scraped faster with respect to the surface of the mixing chamber. The increased speed of operation would require an increased injection of air to accommodate the greater operation.

Since the injection of air results from the sucking in of the air caused by the reduced pressure within the mixing chamber, as the rotor operates at a greater speed, it actually causes a greater reduction of pressure thereby sucking in more air. Thus, the greater the speed, the more air will be injected such that the machine is self regulating in the amount of air that it draws in.

By way of example, it has been found that operating the device at lower than 400 rpm produces a poorer quality product. This can be explained by the fact that there is insufficient vacuum created at that rate for an adequate injection of the air. When the speed increases to about 2000 rpm, the product continues to provide a good quality throughout this entire range. Thus, although the speed varies over a substantially wide speed range, as the speed increases, a greater injection of air results through the self regulating capability such that the quality remains good. Above 2000 rpm, the quality again deteriorates. However, this is as a result of the melting because of the continuous friction as heretofore described and as unrelated to the injection of air. At about 1200 rpm, an excellent product was found to result.

While the invention has been described with respect to several preferred embodiments, it will be appreciated that many variations, modifications an other applications of the invention may be made.

What is claimed is:

1. A machine for making a frozen comestible such as ice cream, from a liquid, comprising:
   a housing;
   a freezing chamber in said housing having an inlet, an outlet, and a smooth inner surface of cylindrical configuration;
   liquid feeding means for feeding the liquid into the inlet of the freezing chamber;
   cooling means externally of said freezing chamber for cooling the freezing chamber below the freezing point of said liquid;
   a rotary assembly including a plurality of radially-extending blades rotatably mounted within said freezing chamber for atomizing, aerating and moving the frozen liquid through the freezing chamber to its outlet;
   said plurality of blades being of a hard elastic, low-friction, plastic material and having a plurality of outer tips, the outer tips of the blades in an unstressed condition lying on an outer diameter larger than the inner diameter of said freezing chamber, whereby when the rotary assembly is inserted into the freezing chamber, the blades are deformed by their engagement with the inner cylindrical surface of the freezing chamber to a stressed condition wherein they forcibly engage the inner cylindrical surface of the freezing chamber and are twisted towards said outlet of the freezing chamber, and wherein said feeding means comprises a supply container disposed vertically above said freezing chamber, a top cover closing said supply container, a feed line from the bottom of said container to the upper end of said freezing chamber for gravity feeding the liquid thereto, an on/off valve in said feed line, and a presetable control member in said top cover venting the upper end of the container to the atmosphere and effective to fix the feed rate of the liquid to said freezing chamber substantially independently of the viscosity of the liquid, and wherein said feeding means further comprises a distribution plate formed with a bottom wall and an overlying annular channel underlying said feed line for receiving the gravity-fed liquid, and an opening through the bottom wall leading to the inlet end of said freezing chamber.

2. The machine according to claim 1, wherein said liquid feeding means feeds the liquid into said feeding chamber of a rate of between 5 & 20 cc/min per 100 cm$^2$ of cooling surface of the freezing chamber.

3. The machine according to claim 2, wherein said liquid feeding means feeds the liquid into said feeding chamber at a rate of 12 & 14 cc/min per 100 cm$^2$ of cooling surface of the freezing chamber.

4. The machine according to claim 1, further comprising an air pump injecting air under superatmospheric pressure into said freezing chamber.

5. The machine according to claim 4, wherein said liquid feeding means comprises a liquid pump for injecting the liquid under superatmospheric pressure into said freezing chamber.

6. The machine according to claim 5, wherein said air pump comprises an outlet nozzle adjacent to the location where said liquid is fed into the freezing chamber so as to aerate the liquid fed into the freezing chamber.

7. A machine for making a frozen comestible such as ice cream from a liquid, comprising:
   a housing;
   a freezing chamber in said housing having an inlet, an outlet and a smooth inner surface of cylindrical configuration; liquid feeding means for feeding the liquid into the inlet of the freezing chamber;
   cooling means externally of said freezing chamber for cooling the chamber below the freezing point of said liquid; a rotary assembly including a plurality of radially extending blades rotatably mounted within said freezing chamber for atomizing, aerating and moving the frozen liquid through the freezing chamber to its outlet;
   said feeding means comprising a supply container disposed vertically above said freezing chamber, a top cover closing said supply container, a feed line from the bottom of said container to the upper end of said freezing chamber for gravity feeding the liquid thereto, an on/off valve in said feed line, and a presetable control member in said top cover venting the upper end of the container to the atmosphere and effective to fix the feed rate of the liquid to said freezing chamber substantially independently of the viscosity of the liquid, and wherein said feeding means further comprises a distribution plate formed with a bottom wall and an overlying annular channel underlying said feed line for receiving the gravity-fed liquid, and an opening through the bottom wall leading to the inlet end of said freezing chamber.

8. A compressorless ice cream making machine comprising:
   a storage compartment for retaining liquid ingredients to be used for making ice-cream;
   a portable removable cartridge having an annular cooling compartment defined by interior and exterior walls, the interior wall forming the outer wall of a mixing chamber, said mixing chamber receiving the liquid ingredients directly therein from the storage compartment;
   means for introducing air into the interior of said mixing chamber separate from the receipt of the ingredients into the mixing chamber;
   motorized rotor means including a plurality of blades rotatably driven within said mixing chamber and effective to atomize the liquid ingredients as atomized particles, to aerate the particles with the air, and to throw the aerated particles against the interior walls;
   cooling means in said cooling compartment for cooling said interior walls to freeze the particles thrown there against, and
   outlet means for extracting from the mixing chamber the frozen particles as ice cream.

9. As in claim 8, wherein said mean for introducing air comprises a cover means on said mixing chamber, a restricted air inlet in said cover means, and wherein said rotor creates a negative pressure within the mixing chamber to such in air through the air inlet whereby the air is injected under pressure.

10. As in claim 8, wherein said means for introducing air comprises self-regulating means whereby increasing the speed of said rotor means to increase the production of ice creams causes an increase in the introduction of air.

11. As in claim 10, wherein the speed of said rotor means in between about 400 rpm and 2000 rpm.

12. As in claim 9, and further comprising conduit means coupled to said restricted air inlet providing a directional flow of air to said mixing chamber.

* * * * *